United States Patent
Xu et al.

(10) Patent No.: US 12,348,667 B2
(45) Date of Patent: *Jul. 1, 2025

(54) METHOD AND APPARATUS FOR GRANTING OR NOT GRANTING A CHARGEABLE PARTY AT A SESSION MANAGEMENT WITH REQUIRED QUALITY OF SERVICE UTILIZING A MAC ADDRESS

(71) Applicant: Telefonaktiebolaget LM Ericsson (publ), Stockholm (SE)

(72) Inventors: Wenliang Xu, Shanghai (CN); Susana Fernandez Alonso, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 106 days.

This patent is subject to a terminal disclaimer.

(21) Appl. No.: 18/523,912

(22) Filed: Nov. 30, 2023

(65) Prior Publication Data

US 2024/0098189 A1    Mar. 21, 2024

Related U.S. Application Data

(63) Continuation of application No. 18/145,012, filed on Dec. 21, 2022, now Pat. No. 11,882,234, which is a (Continued)

(30) Foreign Application Priority Data

Nov. 12, 2018  (WO) ................ PCT/CN2018/115008

(51) Int. Cl.
*H04M 15/00* (2024.01)

(52) U.S. Cl.
CPC .................. *H04M 15/8228* (2013.01); *H04M 15/8016* (2013.01)

(58) Field of Classification Search
CPC ......... H04M 15/8228; H04M 15/8016; H04M 15/08; H04M 15/09; H04M 15/66;
(Continued)

(56) References Cited

U.S. PATENT DOCUMENTS 10,341,392 B2 * 7/2019 Park ...................... H04L 12/282
11,153,785 B2 * 10/2021 Kweon ................. H04W 28/18
(Continued)

FOREIGN PATENT DOCUMENTS

CN    102694768 A    9/2012
CN    105515793 A    4/2016
(Continued)

OTHER PUBLICATIONS

Communication pursuant to Article 94(3) EPC, EP App. No. 19884227.0, Apr. 8, 2024, 7 pages.
(Continued)

*Primary Examiner* — Pakee Fang
(74) *Attorney, Agent, or Firm* — Nicholson De Vos Webster & Elliott LLP

(57) ABSTRACT

Methods and apparatuses for data transmission. A method implemented at a first network function may comprise obtaining information related to network slice selection; and sending a reroute message to an access network node, wherein the reroute message including a container comprising at least one information element of the information related to network slicing selection.

14 Claims, 10 Drawing Sheets

Related U.S. Application Data continuation of application No. 17/285,903, filed as application No. PCT/CN2019/088520 on May 27, 2019, now Pat. No. 11,539,847.

(58) Field of Classification Search
CPC ............ H04M 15/8083; H04M 15/85; H04M 15/853; H04M 15/854; H04W 4/24; H04W 12/08; H04W 4/70; H04W 76/11; H04W 80/10
See application file for complete search history.

(56) References Cited

U.S. PATENT DOCUMENTS

| | | | |
|---|---|---|---|
| 11,265,226 | B2* | 3/2022 | Hu .................... H04W 4/24 |
| 2011/0320619 | A1 | 12/2011 | Kolbe et al. |
| 2014/0066084 | A1* | 3/2014 | Paladugu ............ H04W 76/12 455/452.2 |
| 2015/0359018 | A1* | 12/2015 | Li .................... H04W 76/25 370/329 |
| 2017/0339280 | A1 | 11/2017 | Lu et al. |
| 2019/0020590 | A1 | 1/2019 | Faccin et al. |
| 2019/0037636 | A1 | 1/2019 | Kim et al. |
| 2019/0102085 | A1 | 4/2019 | Yang et al. |
| 2019/0109721 | A1 | 4/2019 | Qiao et al. |
| 2019/0116521 | A1 | 4/2019 | Qiao et al. |
| 2019/0215731 | A1 | 7/2019 | Qiao et al. |
| 2019/0310893 | A1 | 10/2019 | Aronovich |
| 2020/0145538 | A1 | 5/2020 | Qiao et al. |
| 2021/0168584 | A1 | 6/2021 | Li et al. |
| 2021/0243641 | A1 | 8/2021 | Gangakhedkar et al. |

FOREIGN PATENT DOCUMENTS

| | | |
|---|---|---|
| CN | 108702722 A | 10/2018 |
| CN | 108781381 A | 11/2018 |
| EP | 2645764 A1 | 10/2013 |
| KR | 10-2017-0094299 A | 8/2017 |
| KR | 10-2018-0106998 A | 10/2018 |
| WO | 2016/092355 A1 | 6/2016 |
| WO | 2018/087696 A1 | 5/2018 |
| WO | 2018/199611 A1 | 11/2018 |

OTHER PUBLICATIONS

Communication under Rule 71(3) EPC, EP App. No. 19884227.0, Jun. 28, 2024, 6 pages.
Decision to Grant, EP App. No. 19884227.0, Sep. 12, 2024, 2 pages.
Notice of Allowance, CN App. No. 201980073945.7, Sep. 3, 2024, 04 pages of Original Document only.
Office Action, CN App. No. 201980073945.7, Nov. 29, 2023, 10 pages of Original Document Only.
ZTE, "Slice info considered in session binding and PCF selection", Jul. 9-13, 2018, 3 pages, 3GPP TSG-CT WG3 Meeting #97Bis, C3-184504 (revision of C3-184426), Sophia Antipolis, France.
3GPP TS 23.203 V15.4.0, "3rd Generation Partnership Project; Technical Specification Group Services and System Aspects; Policy and charging control architecture (Release 15)," Sep. 2018, 262 pages, 3GPP Organizational Partners.
3GPP TS 23.501 V15.3.0, "3rd Generation Partnership Project; Technical Specification Group Services and System Aspects; System Architecture for the 5G System; Stage 2 (Release 15)," Sep. 2018, 226 pages, 3GPP Organizational Partners.
3GPP TS 23.502 V15.3.0, "3rd Generation Partnership Project; Technical Specification Group Services and System Aspects; Procedures for the 5G System; Stage 2 (Release 15)," Sep. 2018, 7 pages, 3GPP Organizational Partners.
3GPP TS 23.682 V16.0.0, "3rd Generation Partnership Project; Technical Specification Group Services and System Aspects; Architecture enhancements to facilitate communications with packet data networks and applications (Release 16)," Sep. 2018, 126 pages, 3GPP Organizational Partners.
3GPP TS 29.122 V15.0.0, "3rd Generation Partnership Project; Technical Specification Group Core Network and Terminals; T8 reference point for Northbound APIs; (Release 15)," Jun. 2018, 255 pages, 3GPP Organizational Partners.
3GPP TS 29.122 V15.1.0, "3rd Generation Partnership Project; Technical Specification Group Core Network and Terminals; T8 reference point for Northbound APIs; (Release 15)," Sep. 2018, 273 pages, 3GPP Organizational Partners.
3GPP TS 29.514 V15.1.0, "3rd Generation Partnership Project; Technical Specification Group Core Network and Terminals; 5G System; Policy Authorization Service; Stage 3 (Release 15)," Sep. 2018, 81 pages, 3GPP Organizational Partners.
3GPP TS 29.522 V15.1.0, "3rd Generation Partnership Project; Technical Specification Group Core Network and Terminals; 5G System; Network Exposure Function Northbound APIs; Stage 3 (Release 15)," Sep. 2018, 29 pages, 3GPP Organizational Partners.
3GPP TS 29.571 V15.1.0, "3rd Generation Partnership Project; Technical Specification Group Core Network and Terminals; 5G System; Common Data Types for Service Based Interfaces; Stage 3 (Release 15)," Sep. 2018, 55 pages, 3GPP Organizational Partners.
Decision to Grant, JP App. No. 2021-524972, Jan. 13, 2023, 5 pages (2 pages of English Translation and 3 pages of Original Document).
International Preliminary Report on Patentability for Application No. PCT/CN2019/088520, dated Jan. 18, 2021, 14 pages.
International Search Report and Written Opinion for Application No. PCT/CN2019/088520, dated Jul. 23, 2019, 10 pages.
Non-Final Office Action, U.S. Appl. No. 18/145,012, Jul. 5, 2023, 13 pages.
Notice of Allowance, U.S. Appl. No. 17/285,903, Aug. 22, 2022, 16 pages.
Notice of Allowance, U.S. Appl. No. 17/285,903, Oct. 14, 2022, 3 pages.
Notice of Allowance, U.S. Appl. No. 18/145,012, Oct. 10, 2023, 9 pages.
Notice of Final Rejection, KR App. No. 10-2021-7015441, Aug. 30, 2022, 6 pages (3 pages of English Translation and 3 pages of Original Document).
Notice of Reasons for Refusal, JP App. No. 2021-524972, Jul. 26, 2022, 11 pages (5 pages of English Translation and 6 pages of Original Document).
Notification of Reason for Refusal, KR App. No. 10-2021-7015441, Jan. 20, 2022, 14 pages (7 pages of English Translation and 7 pages of Original Document).
Orange, "Missing NEF services," Jul. 2-6, 2018, 6 pages, 3GPP TSG-SA2 Meeting #128, S2-187587 (revision of S2-187060), Vilnius, Lithuania.
Qualcomm Incorporated, "Options on packet filters extension for PDU sessions of type Ethernet and unstructured in 5GS," May 15-19, 2017, 3 pages, SA WG2 Meeting #121, S2-173117, Hangzhou, P.R. China.
Supplementary European Search Report and Search Opinion, EP App. No. 19884227.0, Jul. 8, 2022, 13 pages.
Restriction Requirement, U.S. Appl. No. 18/145,012, Apr. 21, 2023, 5 pages.

* cited by examiner

500 ─╮
　　　　502

Sending to a network device a create request related to a session between the application server and a user equipment (UE) including a Media Access Control (MAC) address of the UE and at least one Ethernet flow information of the UE

504

Receiving a create response indicating whether the create request is granted or not from the network device

Sending to a network device a create request related to a session between the application server and a user equipment (UE) including a Media Access Control (MAC) address of the UE and at least one Ethernet flow information of the UE, wherein the create request indicates setting a chargeable party at the session set-up

604

Receiving a create response indicating whether the create request is granted or not from the network device

606

Sending to the network device a chargeable party update request including the at least one Ethernet flow information of the UE

608

Receiving a chargeable party update response indicating whether the chargeable party update request is granted or not from the network device

902
Receiving from an application server a create request related to a session between an application server and a user equipment (UE) including a Media Access Control (MAC) address of the UE and at least one Ethernet flow information of the UE, wherein the create request indicates setting a chargeable party at the session set-up

904
Determining whether to authorize the create request indicating setting a chargeable party at the session set-up

906
Sending a create response indicating whether the create request is granted or not to the application server

908
Receiving from the application server a chargeable party update request including the at least one Ethernet flow information of the UE

910
Determining whether to authorize the chargeable party update request

912
Sending a chargeable party update response indicating whether the chargeable party update request is granted or not to the application server

FIG. 9

METHOD AND APPARATUS FOR GRANTING OR NOT GRANTING A CHARGEABLE PARTY AT A SESSION MANAGEMENT WITH REQUIRED QUALITY OF SERVICE UTILIZING A MAC ADDRESS

CROSS-REFERENCE TO RELATED APPLICATIONS

This application is a continuation of application Ser. No. 18/145,012, filed Dec. 21, 2022, which is a continuation of application Ser. No. 17/285,903, filed Apr. 15, 2021 (now U.S. Pat. No. 11,539,847 issued Dec. 27, 2022), which is a National stage of International Application No. PCT/CN2019/088520, filed May 27, 2019, which claims priority to International Application No. PCT/CN2018/115008, filed Nov. 12, 2018, which are all hereby incorporated by reference.

TECHNICAL FIELD

The non-limiting and exemplary embodiments of the present disclosure generally relate to the technical field of communications, and specifically to methods and apparatuses for session management.

BACKGROUND

This section introduces aspects that may facilitate a better understanding of the disclosure. Accordingly, the statements of this section are to be read in this light and are not to be understood as admissions about what is in the prior art or what is not in the prior art.

Currently core network architecture for fifth generation (5G) network such as new radio (NR) has been proposed. FIG. 1 is a diagram illustrating an exemplary 5G system architecture according to an embodiment of the present disclosure, which is a copy of FIG. 4.2.3-1 of 3rd Generation Partnership Project (3GPP) T523.501 and the disclosure of 3GPP T523.501 is incorporated by reference herein in its entirety. As shown in FIG. 1, 5G system architecture may comprise a plurality of network functions (NFs) such as Authentication Server Function (AUSF), Access and Mobility Management Function (AMF), Data Network (DN) (e.g. operator services, Internet access or 3rd party services), Network Exposure Function (NEF), Network Repository Function (NRF), Network Slice Selection Function (NSSF), Policy Control Function (PCF), Session Management Function (SMF), Unified Data Management (UDM), User Plane Function (UPF), Application Function (AF), User Equipment (UE), (Radio) Access Network ((R)AN), etc.

The NR system can support various session types such as Internet protocol (IP) protocol data unit (PDU) Session type, Ethernet PDU Session type, and Unstructured PDU Session type. FIG. 2 shows a procedure of setting a chargeable party at AF session set-up, which is a copy of FIG. 4.15.6.4-1 of 3GPP T523.502 and the disclosure of 3GPP T523.502 is incorporated by reference herein in its entirety. FIG. 3 shows a procedure of changing the chargeable party during the session, which is a copy of FIG. 4.15.6.5-1 of 3GPP TS23.502. FIG. 4 shows a procedure of setting up an AF session with required quality of service (QoS) procedure, which is a copy of FIG. 4.15.6.6-1 of 3GPP TS23.502.

SUMMARY

In a first aspect of the disclosure, there is provided a method implemented at an application server. The method may comprise sending to a network device a create request related to a session between the application server and a user equipment (UE) including a Media Access Control (MAC) address of the UE and at least one Ethernet flow information of the UE; and receiving a create response indicating whether the create request is granted or not from the network device.

In a second aspect of the disclosure, there is provided a method implemented at a network device. The method may comprise receiving from an application server a create request related to a session between an application server and a user equipment (UE) including a Media Access Control (MAC) address of the UE and at least one Ethernet flow information of the UE; sending an authorization request to another network device to determine whether to authorize the create request; and sending a create response indicating whether the create request is granted or not to the application server.

In a third aspect of the disclosure, there is provided an apparatus implemented at an application server. The apparatus may comprise a processor; and a memory coupled to the processor, said memory containing instructions executable by said processor, whereby said apparatus is operative to: send to a network device a create request related to a session between the application server and a user equipment (UE) including a Media Access Control (MAC) address of the UE and at least one Ethernet flow information of the UE; and receive a create response indicating whether the create request is granted or not from the network device.

In a fourth aspect of the disclosure, there is provided an apparatus implemented at a network device. The apparatus may comprise a processor; and a memory coupled to the processor, said memory containing instructions executable by said processor, whereby said apparatus is operative to receive from an application server a create request related to a session between an application server and a user equipment (UE) including a Media Access Control (MAC) address of the UE and at least one Ethernet flow information of the UE; send an authorization request to another network device to determine whether to authorize the create request; and send a create response indicating whether the create request is granted or not to the application server.

In a fifth aspect of the disclosure, there is provided an apparatus implemented at an application server. The apparatus may comprise a first sending unit configured to send to a network device a create request related to a session between the application server and a user equipment (UE) including a Media Access Control (MAC) address of the UE and at least one Ethernet flow information of the UE; and a first receiving unit configured to receive a create response indicating whether the create request is granted or not from the network device.

In a sixth aspect of the disclosure, there is provided an apparatus implemented at a network device. The apparatus may comprise a first receiving unit configured to receive from an application server a create request related to a session between an application server and a user equipment (UE) including a Media Access Control (MAC) address of the UE and at least one Ethernet flow information of the UE; a sending unit configured to send an authorization request to another network device to determine whether to authorize the create request; and a first sending unit configured to send a create response indicating whether the create request is granted or not to the application server.

In a seventh aspect of the disclosure, there is provided a computer program product, comprising instructions which, when executed on at least one processor, cause the at least one processor to carry out the method according to the first aspect of the disclosure.

In an eighth aspect of the disclosure, there is provided a computer program product, comprising instructions which, when executed on at least one processor, cause the at least one processor to carry out the method according to the second aspect of the disclosure.

In a ninth aspect of the disclosure, there is provided a computer-readable storage medium storing instructions which when executed by at least one processor, cause the at least one processor to carry out the method according to the first aspect of the disclosure.

In a tenth aspect of the disclosure, there is provided a computer-readable storage medium storing instructions which when executed by at least one processor, cause the at least one processor to carry out the method according to the second aspect of the disclosure.

Many advantages may be achieved by applying the proposed solution according to some embodiments of the present disclosure. For example, some embodiments of the present disclosure can allow Ethernet UE to utilize the existing Chargeable Party and Setting up an AF session with required QoS functions in the NR.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 5 shows a flowchart of a method according to an embodiment of the present disclosure;

FIG. 6 shows a flowchart of a method according to another embodiment of the present disclosure;

FIG. 9 shows a flowchart of a method according to another embodiment of the present disclosure;

DETAILED DESCRIPTION

Figure 1:
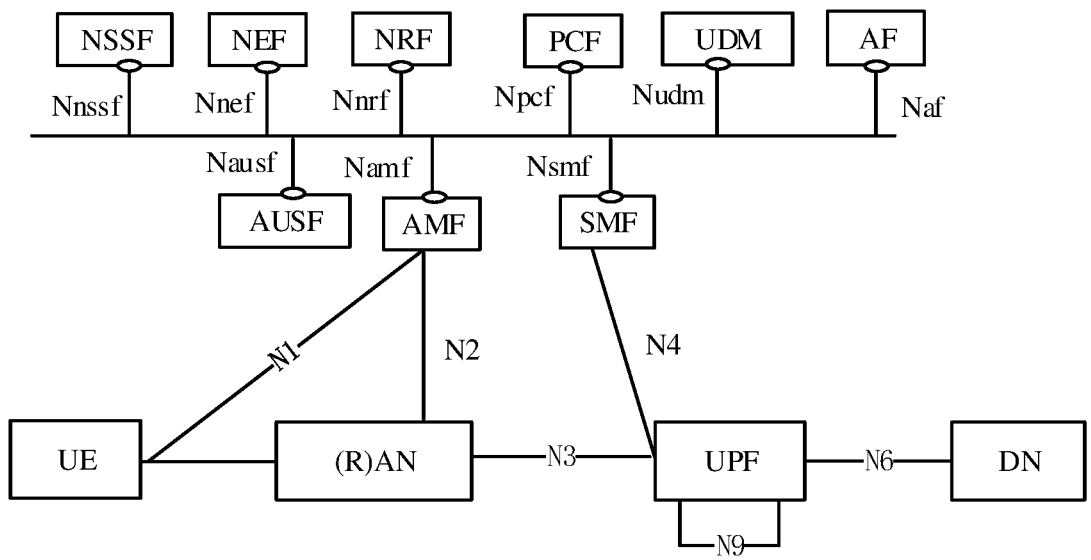
FIG. 1 is a diagram illustrating an exemplary 5G system architecture according to an embodiment of the present disclosure.

For the purpose of explanation, details are set forth in the following description in order to provide a thorough understanding of the embodiments disclosed. It is apparent, however, to those skilled in the art that the embodiments may be implemented without these specific details or with an equivalent arrangement.

As used herein, the term "network" refers to a network following any suitable wireless communication standards such as new radio (NR), future development of NR, and so on. In the following description, the terms "network" and "system" can be used interchangeably. Furthermore, the communications between two devices in the network may be performed according to any suitable communication protocols, including, but not limited to, the communication protocols as defined by some of standards organizations such as 3GPP, the International Organization for Standardization (ISO), the International Telecommunication Union (ITU), the Institute of Electrical and Electronics Engineers (IEEE), and the Internet Engineering Task Force (IETF), European Telecommunications Standards Institute (ETSI), etc. For example, the communication protocols as defined by 3GPP may comprise the fourth generation (4G), 4.5G, 5G communication protocols, and/or any other protocols either currently known or to be developed in the future.

The term "network device" refers to a network device in a communication network via which a terminal device accesses to the network and receives services therefrom. For example, in a wireless communication network such as a 3GPP-type cellular network, the network device may comprise access network device and core network device. For example, the access network device may comprise base station (BS), an Integrated Access and Backhaul (IAB) node, an access point (AP), a multi-cell/multicast coordination entity (MCE), etc. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth. The core network device may comprise a plurality of network devices which may offer numerous services to the customers who are interconnected by the access network device. Each access network device is connectable to the core network device over a wired or wireless connection.

The term "network function (NF)" refers to any suitable function which can be implemented in a network device of a wireless/wired communication network. For example, in 5G network, the network function may comprise AUSF, AMF, DN, NEF, NRF, NSSF, PCF, SMF, UDM, UPF, AF, UE, (R)AN, 5G-Equipment Identity Register (5G-EIR), Security Edge Protection Proxy (SEPP), Network Data Analytics Function (NWDAF), Unified Data Repository (UDR), Unstructured Data Storage Function (UDSF), etc.

The term "terminal device" refers to any end device that can access a communication network and receive services therefrom. By way of example and not limitation, in the wireless communication network, the terminal device may refer to a mobile terminal, a user equipment (UE), a terminal device, or other suitable devices. The terminal device may be, for example, a Subscriber Station (SS), a Portable Subscriber Station, a Mobile Station (MS), or an Access Terminal (AT). The terminal device may include, but not limited to, a portable computer, an image capture device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable device, a vehicle-mounted wireless device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a UE may represent a terminal device configured for communication in accordance with one or more communication standards promulgated by the 3GPP, such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a UE may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

As yet another example, in an Internet of Things (IOT) scenario, a terminal device may represent a machine or other device that performs monitoring and/or measurements, and transmits the results of such monitoring and/or measurements to another terminal device and/or network equipment. The UE may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a UE may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

Although the subject matter described herein may be implemented in any appropriate type of system using any suitable components, the embodiments disclosed herein are described in relation to a communication system complied with the exemplary system architecture illustrated in FIG. 1. The diagram in FIG. 1 may represent a high level architecture in the next generation network such as 5G. For simplicity, the system architecture of FIG. 1 only depicts some exemplary elements such as AUSF, AMF, DN, NEF, NRF, NSSF, PCF, SMF, UDM, UPF, AF, UE, (R)AN. In practice, a communication system may further include any additional elements suitable to support communication between terminal devices or between a wireless device and another communication device, such as a landline telephone, a service provider, or any other network node or terminal device. The communication system may provide communication and various types of services to one or more terminal devices to facilitate the terminal devices' access to and/or use of the services provided by, or via, the communication system.

As further illustrated in FIG. 1, the exemplary system architecture also contains the service-based interfaces such as Nnrf, Nnef, Nausf, Nudm, Npcf, Namf and Nsmf exhibited by NFs such as the NRF, the NEF, the AUSF, the UDM, the PCF, the AMF and the SMF. In addition, FIG. 1 also shows some reference points such as N1, N2, N3, N4, N6 and N9, which can support the interactions between NF services in the NFs. For example, these reference points may be realized through corresponding NF service-based interfaces and by specifying some NF service consumers and providers as well as their interactions in order to perform a particular system procedure.

Various NFs shown in FIG. 1 may be responsible for functions such as session management, mobility management, authentication, and security. These may be critical for delivering a service in the network. The AUSF, AMF, DN, NEF, NRF, NSSF, PCF, SMF, UDM, UPF, AF, UE, (R)AN may include the functionality for example as defined in 3GPP TS 23.501 or its future version. For example, the NEF may act as a gateway which can enable external users to monitor, provision and enforce an application policy for users inside the network. The AUSF may be configured as an authentication server. The UDM can store subscriber data and profiles. The PCF can provide a policy framework incorporating network slicing, roaming and mobility management. The AMF can manage access control and mobility. The SMF can set up and manage sessions according to a network policy. The UPF can be deployed in various configurations and locations according to the service type.

Figure 2:
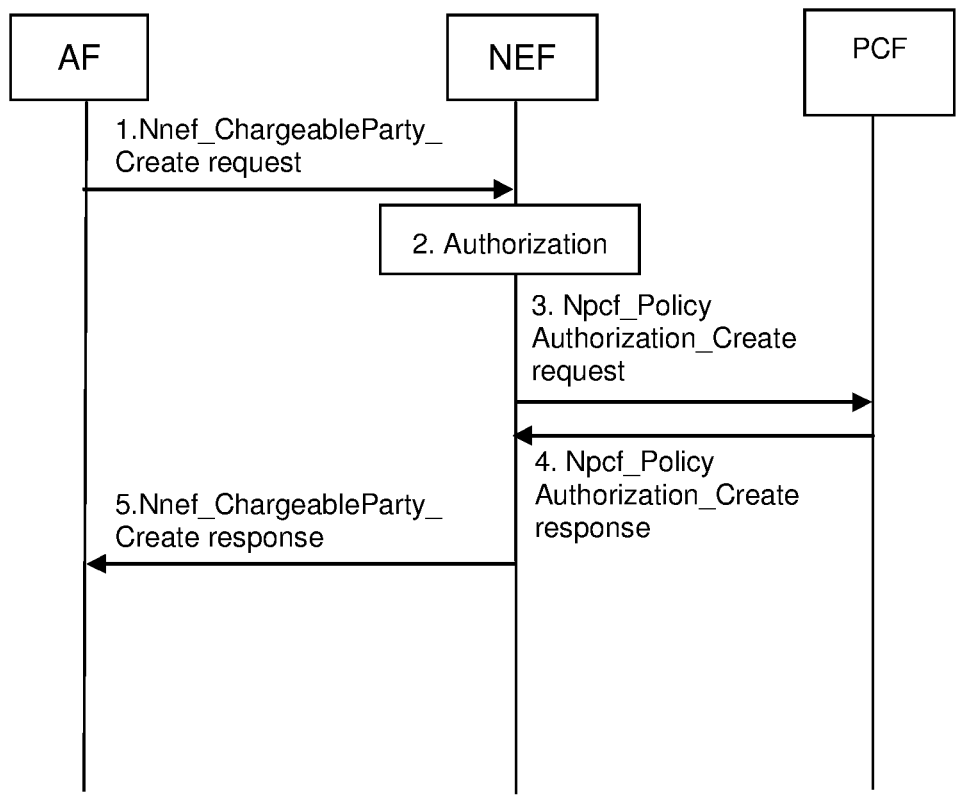
FIG. 2 shows a procedure of setting a chargeable party at AF session set-up.

As described above, the NR system can support various session types such as IP PDU Session type, Ethernet PDU Session type, and Unstructured PDU Session type. FIG. 2 shows a procedure of setting a chargeable party at AF session set-up. As shown in FIG. 2, clause 4.15.6.4 of 3GPP TS23.502 describes "1. When setting up the connection between the AF and UE, the AF may request to become the chargeable party for the session to be set up by sending a Nnef_ChargeableParty_Create request message (AF Identifier, UE IP address, Description of the application flows, Sponsor Information, Sponsoring Status, Reference ID) to the NEF, The Sponsoring Status indicates whether sponsoring is started or stopped, i.e. whether the 3rd party service provider is the chargeable party or not. The Reference ID parameter identifies a previously negotiated transfer policy for background data transfer as defined in clause 4.16.7. The NEF asssigns a Transaction Reference ID to the Nnef_ChargeableParty_Create request.

2. The NEF authorizes the AF request to sponsor the application traffic and stores the sponsor information together with the AF Identifier and the Transaction Reference ID. If the authorisation is not granted, step 2 is skipped and the NEF replies to the AF with a Result value indicating that the authorisation failed.

NOTE: Based on operator configuration, the NEF may skip this step. In this case the authorization is performed by the PCF in step 3.

3. The NEF interacts with the PCF by triggering a Npcf_PolicyAuthorization_Create request message and provides IP filter information, sponsored data connectivity information (as defined in TS 23.203 [24]), Reference ID (if received from the AF) and Sponsoring Status (if received from the AF) to the PCF.

4. The PCF determines whether the request is allowed and notifies the NEF if the request is not authorized. If the request is not authorized, NEF responds to the AF in step 5 with a Result value indicating that the authorization failed.

5. The NEF sends a Nnef_ChargeableParty_Create response message (Transaction Reference ID, Result) to the AF. Result indicates whether the request is granted or not."

Figure 3:
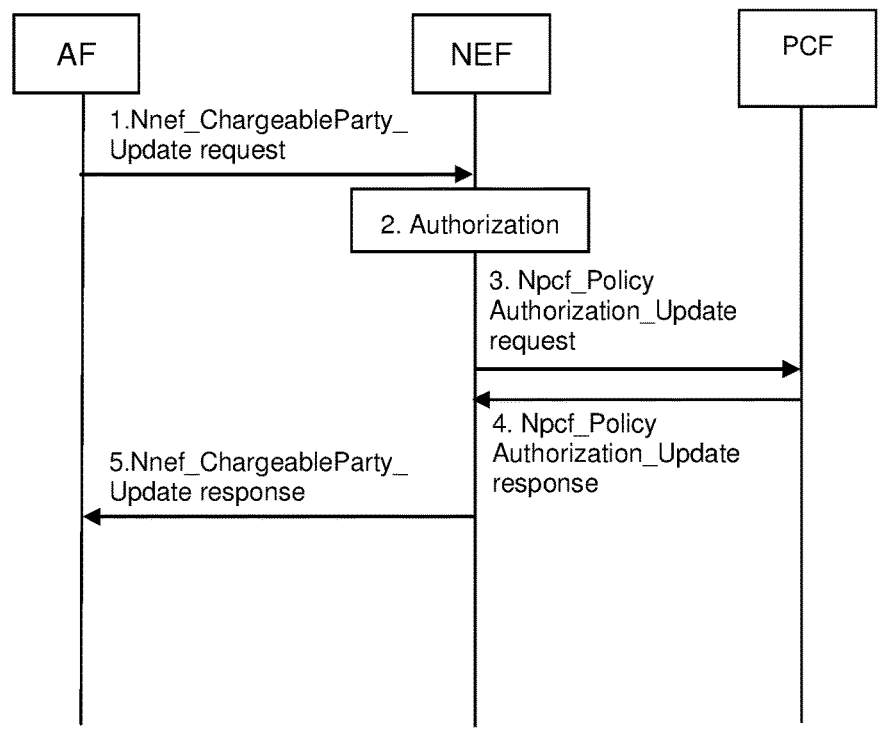
FIG. 3 shows a procedure of changing the chargeable party during the session.

FIG. 3 shows a procedure of changing the chargeable party during the session. As shown in FIG. 3, clause 4.15.6.5 of 3GPP TS23.502 describes "1. For the ongoing AF session, the AF may send a Nnef_ChargeableParty_Update request message (AF Identifier, Transaction Reference ID, Sponsoring Status, Reference ID) to the NEF. The Sponsoring Status indicates whether sponsoring is enabled or disabled, i.e. whether the 3rd party service provider is the chargeable party or not. The Reference ID parameter identifies a previously negotiated transfer policy for background data transfer as defined in clause 4.16.7. The Transaction Reference ID provided in the Change chargeable party request message is set to the Transaction Reference ID that was assigned, by the NEF, to the Nnef_ChargeableParty_Create request.

2. The NEF authorizes the AF request of changing the chargeable party. If the authorisation is not granted, step 3 is skipped and the NEF replies to the AF with a Result value indicating that the authorisation failed.

NOTE: Based on operator configuration, the NEF may skip this step. In this case the authorization is performed by the PCF in step 3.

3. The NEF interacts with the PCF by triggering a Npcf_PolicyAuthorization_Update request and provides IP filter information, sponsored data connectivity information (as defined in TS 23.203 [24]), Reference ID (if received from the AF) and Sponsoring Status (if received from the AF) to the PCF.

4. The PCF determines whether the request is allowed and notifies the NEF if the request is not authorized. If the request is not authorized, NEF responds to the AF in step 5 with a Result value indicating that the authorization failed.

5. The NEF sends a Nnef_ChargeableParty_Update response message (Transaction Reference ID, Result) to the AF. Result indicates whether the request is granted or not."

Figure 4:
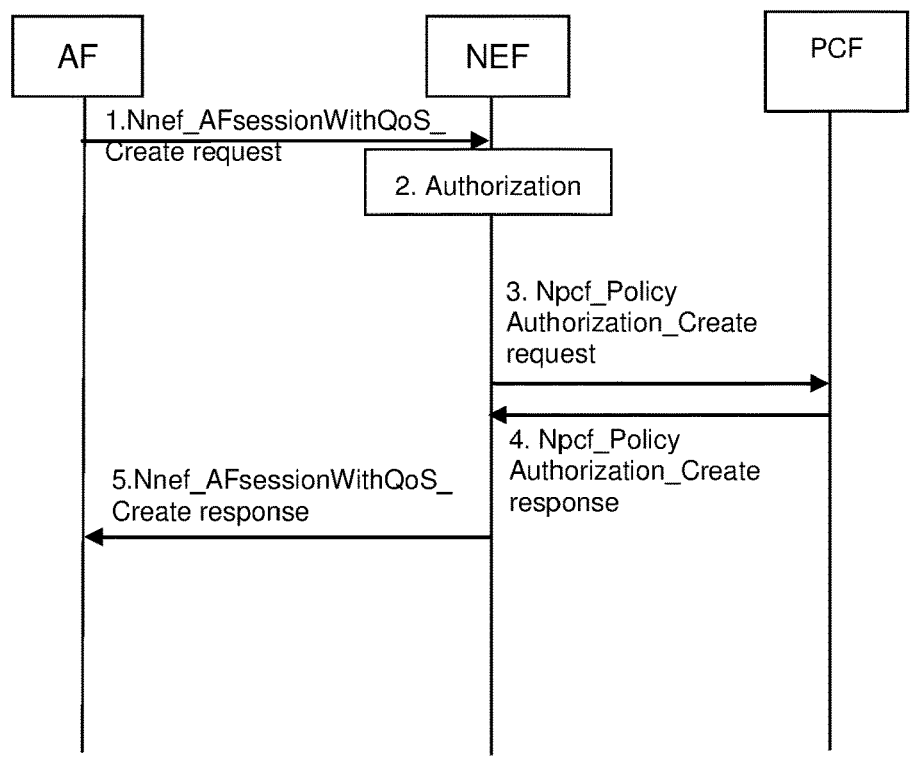
FIG. 4 shows a procedure of setting up an AF session with required QoS procedure.

FIG. 4 shows a procedure of setting up an AF session with required QoS procedure. As shown in FIG. 4, clause 4.15.6.6 of 3GPP TS23.502 describes "1. When setting up the connection between AF and the UE with required QoS for the service, the AF sends an Nnef_AFsessionWithQoS_Create request message (UE IP address, AF Identifier, Description of the application flows, QoS reference) to the NEF. Optionally, a period of time or a traffic volume for the requested QoS can be included in the AF request. The NEF assigns a Transaction Reference ID to the Nnef_AFsessionWithQoS_Create request.

2. The NEF authorizes the AF request and may apply policies to control the overall amount of pre-defined QoS authorized for the AF. If the authorisation is not granted, steps 3 and 4 are skipped and the NEF replies to the AF with a Result value indicating that the authorisation failed.

3. The NEF interacts with the PCF by triggering a Npcf_PolicyAuthorization_Create request and provides IP filter information, sponsored data connectivity information (as defined in TS 23.203 [24]), Reference ID (if received from the AF) and Sponsoring Status (if received from the AF) to the PCF.

The PCF derives the required QoS based on the information provided by the NEF and determines whether this QoS is allowed (according to the PCF configuration for this AF), and notifies the result to the NEF.

The PCF notifies the NEF whether the transmission resources corresponding to the QoS request are established or not.

4. The PCF determines whether the request is allowed and notifies the NEF if the request is not authorized. If the request is not authorized, NEF responds to the AF in step 5 with a Result value indicating that the authorization failed.

5. The NEF sends a Nnef_AFsessionWithQoS_Create response message (Transaction Reference ID, Result) to the AF. Result indicates whether the request is granted or not."

The above procedures as shown in FIGS. 2-4 only support the IP PDU Session type but can not support the Ethernet PDU Session type.

To overcome or mitigate the above mentioned problem or other problems or provide a useful solution, the embodiments of the present disclosure propose a solution. Some embodiments of the present disclosure propose an extension of the ChargeableParty Application Program Interface (API) and AsSessionWithQoS API as defined in 3GPP TS29.122 so that the AF can provide information related to Ethernet UE in order to perform the same functionality as IP UE. The disclosure of 3GPP TS29.122 is incorporated by reference herein in its entirety. Some embodiments of the present disclosure define specific attributes to provide information about the Ethernet UE. Some embodiments of the present disclosure define the attributes such as Ethernet UE address and its related traffic filters.

FIG. 5 shows a flowchart of a method 500 according to an embodiment of the present disclosure, which may be performed by an apparatus implemented in at an application server or communicatively coupled to the application server such as the AF as shown in FIGS. 1-4. As such, the application server may provide means for accomplishing various parts of the method 500 as well as means for accomplishing other processes in conjunction with other components.

At block 502, the application server may send to a network device a create request related to a session between the application server and a UE including a Media Access Control (MAC) address of the UE and at least one Ethernet flow information of the UE. The network device may be NEF as shown in FIGS. 1-4 in an embodiment or any other suitable network devices which can manage the Ethernet session in other embodiments. The create request may be the create request of charging, QoS, policy management, etc. of the Ethernet session. The create request may further include any suitable information relate to the Ethernet session management. For example, the create request may further include at least one of the application server Identifier (ID), Sponsor Information, Sponsoring Status, Reference Identifier, QoS reference, time period and/or traffic volume used for sponsoring, etc. The Sponsoring Status may indicate whether sponsoring is started or stopped, i.e. whether the 3rd party service provider is the chargeable party or not. The Reference ID parameter may identify a previously negotiated transfer policy for background data transfer as defined in clause 4.16.7 of 3GPP T523.502. The network device may assign a Transaction Reference ID to the create request.

The Ethernet flow can be defined by any suitable ways. For example, the Ethernet flow can be defined by a pair of source MAC address and destination MAC address. In another example, the Ethernet flow can be defined by any suitable combination of source MAC address, destination MAC address, source IP address, destination IP address, source UDP port, destination UDP port, source TCP port, destination TCP port, Uniform Resource Locator (URL), etc.

The application server can obtain the MAC address of the UE and the at least one Ethernet flow information of the UE in various ways. For example, when the UE has communicated with the application server by using Ethernet network communication, the application server can obtain the MAC address of the UE. When the Ethernet flow is defined by a pair of source MAC address and destination MAC address, then the application server can determine the Ethernet flow based on the obtained MAC address of the UE and its MAC address. In another example, the application server can obtain the MAC address of the UE and at least one Ethernet flow information of the UE by sending a request to the UE and receiving a response including this information from the UE. In still another example, the UE may register this information to the application server. In still another example, the application server may obtain this information from another device such as network management device.

When the network device receives the create request, it may determine whether to authorize the create request and send a create response indicating whether the create request is granted or not to the application server. The operations related to the network device will be described in the following.

At block 504, the application server may receive the create response indicating whether the create request is granted or not from the network device. For example, if the create request is not granted, the application server may resend the create request or perform any other suitable operations.

In an embodiment, the create request may indicate setting a chargeable party at the session set-up or setting up the session with required QoS. For example, the chargeable party can sponsor the UE traffic by requesting a chargeable party either at the Ethernet session setup or during the Ethernet session. The chargeable party can be any suitable company, organization, entity, government, user, etc.

FIG. 6 shows a flowchart of a method 600 according to an embodiment of the present disclosure, which may be performed by an apparatus implemented in at an application server or communicatively coupled to the application server such as the AF as shown in FIGS. 1-4. As such, the application server may provide means for accomplishing various parts of the method 600 as well as means for accomplishing other processes in conjunction with other components. In this embodiment, the create request indicates setting a chargeable party at the session set-up. For some parts which have been described in the above embodiments, detailed description thereof is omitted here for brevity.

At block 602, the application server may send to a network device a create request related to a session between the application server and a UE including a Media Access Control (MAC) address of the UE and at least one Ethernet flow information of the UE, wherein the create request indicates setting a chargeable party at the session set-up. The create request may further include any other suitable information such as at least one of the application server Identifier, Sponsor Information, Sponsoring Status, Reference Identifier (ID), time period and/or traffic volume used for sponsoring, etc. The Sponsoring Status may indicate whether sponsoring is started or stopped, i.e. whether the 3rd party service provider is the chargeable party or not. The Reference ID parameter may identify a previously negotiated transfer policy for background data transfer as defined in clause 4.16.7 of 3GPP T523.502 or its future version. The network device may assign a Transaction Reference ID to the create request.

When the network device receives the create request, it may determine whether to authorize the create request and send a create response indicating whether the create request is granted or not to the application server.

At block 604, the application server may receive the create response indicating whether the create request is granted or not from the network device.

At block 606, the application server may send to the network device a chargeable party update request including the at least one Ethernet flow information of the UE. For example, the application server may send the chargeable party update request when at least one parameter included in the create request is required to be updated. The chargeable party update request may further include any other suitable information such as application server Identifier, Transaction Reference ID, Sponsoring Status, Reference ID. The Sponsoring Status indicates whether sponsoring is enabled or disabled, i.e. whether the 3rd party service provider is the chargeable party or not. The Reference ID parameter may identify a previously negotiated transfer policy for background data transfer as defined in clause 4.16.7 of 3GPP T523.502 or its future version. The Transaction Reference ID provided in the chargeable party update request message is set to the Transaction Reference ID that was assigned, by the network device such as NEF, to the create request.

When the network device receives the chargeable party update request, it may determine whether to authorize the chargeable party update request and send a chargeable party update response indicating whether the chargeable party update request is granted or not to the application server. The operations related to the network device will be described in the following.

At block 608, the application server may receive the chargeable party update response from the network device. For example, if the chargeable party update request is not granted, the application server may resend the chargeable party update request or perform any other suitable operations.

In an embodiment, the chargeable party update request may comprise a Nnef_ChargeableParty_Update request as defined in clause 5.2.6.8.3 of 3GPP T523.502 or its future version. The chargeable party update response may comprise a Nnef_ChargeableParty_Update response as defined in clause 5.2.6.8.3 of 3GPP T523.502 or its future version.

In an embodiment, the chargeable party update request may be included in a Hypertext Transfer Protocol (HTTP) PATCH message.

Figure 7:
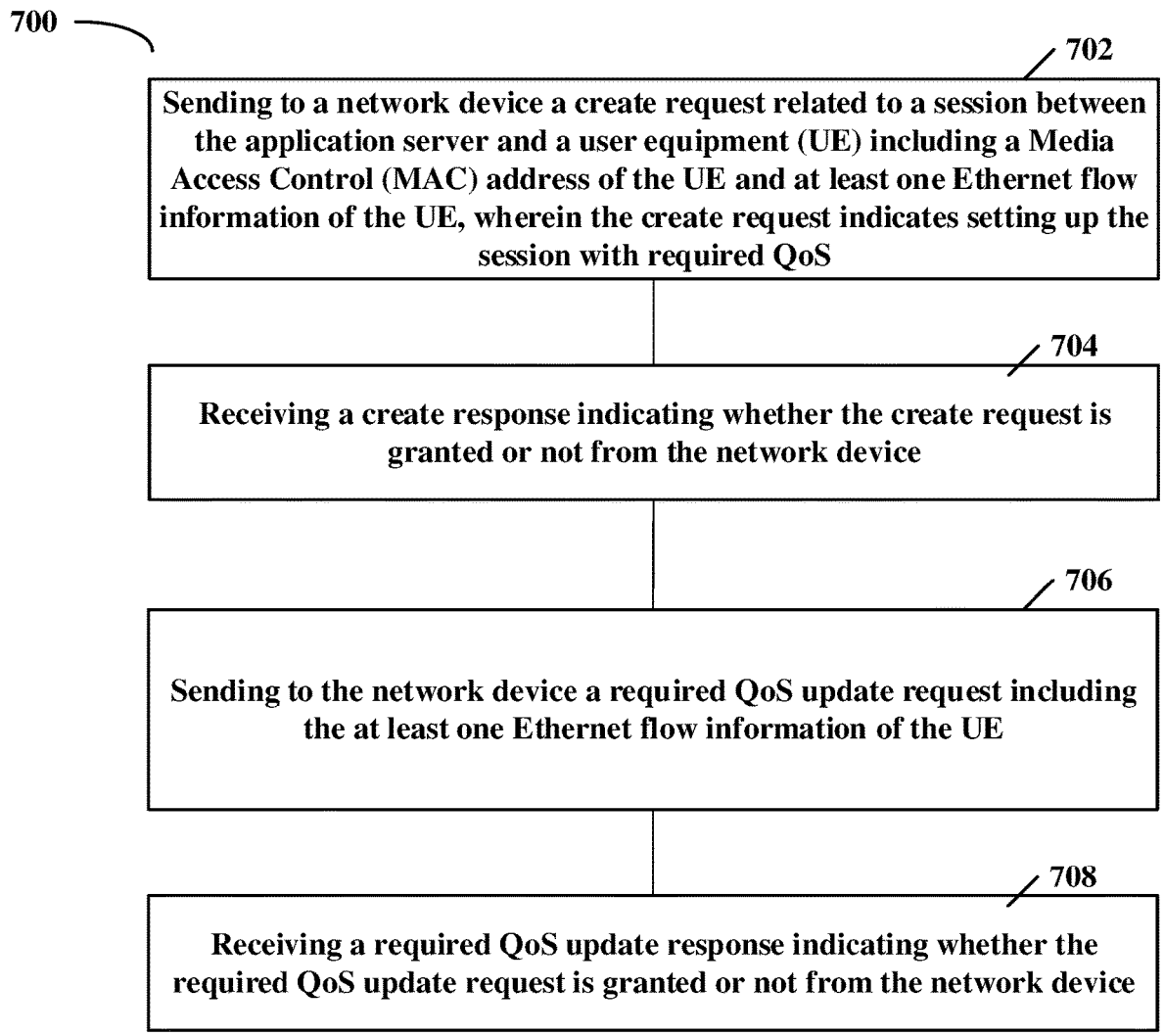
FIG. 7 shows a flowchart of a method according to another embodiment of the present disclosure.

FIG. 7 shows a flowchart of a method 700 according to an embodiment of the present disclosure, which may be performed by an apparatus implemented in at an application server or communicatively coupled to the application server such as the AF as shown in FIGS. 1-4. As such, the application server may provide means for accomplishing various parts of the method 700 as well as means for accomplishing other processes in conjunction with other components. In this embodiment, the create request indicates setting up the session with required QoS. For some parts which have been described in the above embodiments, detailed description thereof is omitted here for brevity.

At block 702, the application server may send to a network device a create request related to a session between the application server and a UE including a Media Access Control (MAC) address of the UE and at least one Ethernet flow information of the UE, wherein the create request indicates setting up the session with required QoS. The create request may further include any other suitable information such as at least one of the application server Identifier, QoS reference, time period and/or traffic volume for the requested QoS, etc. The network device may assign a Transaction Reference ID to the create request.

When the network device receives the create request, it may determine whether to authorize the create request and send a create response indicating whether the create request is granted or not to the application server. The operations related to the network device will be described in the following.

At block 704, the application server may receive the create response indicating whether the create request is granted or not from the network device.

At block 706, the application server may send to the network device a required QoS update request including the at least one Ethernet flow information of the UE. For example, the application server may send the required QoS update request when at least one parameter included in the create request is required to be updated. The required QoS update request may further include any other suitable information such as application server Identifier, Transaction Reference ID, etc. The Transaction Reference ID provided in the required QoS update request message is set to the Transaction Reference ID that was assigned, by the network device such as NEF, to the create request.

When the network device receives the required QoS update request, it may determine whether to authorize the required QoS update request and send a required QoS update response indicating whether the required QoS update request is granted or not to the application server. The operations related to the network device will be described in the following.

At block 708, the application server may receive the required QoS update response from the network device. For example, if the required QoS update request is not granted, the application server may resend the required QoS update request or perform any other suitable operations.

In an embodiment, the required QoS update request may be included in a Hypertext Transfer Protocol (HTTP) PUT or PATCH message.

In an embodiment, the create request comprises a Nnef_ChargeableParty_Create request as described in clause 4.15.6.4 of 3GPP TS23.502 or its future version, or a Nnef_AFsessionWithQoS_Create request as described in clause 4.15.6.6 of 3GPP TS23.502 or its future version. The create response comprises a Nnef_ChargeableParty_Create response as described in clause 4.15.6.4 of 3GPP TS23.502 or its future version, or a Nnef_AFsessionWithQoS_Create response as described in clause 4.15.6.6 of 3GPP TS23.502 or its future version. In addition, UE Internet protocol (IP) address and Description of application flows in the Nnef_ChargeableParty_Create request or the Nnef_AFsessionWithQoS_Create request are replaced with the MAC address of the UE and at least one Ethernet flow information of the UE respectively.

In an embodiment, the create request may be included in a Hypertext Transfer Protocol (HTTP) POST message.

In an embodiment, the application server may comprise an application function (AF) and the network device may comprise a Network Exposure function (NEF).

Figure 8:
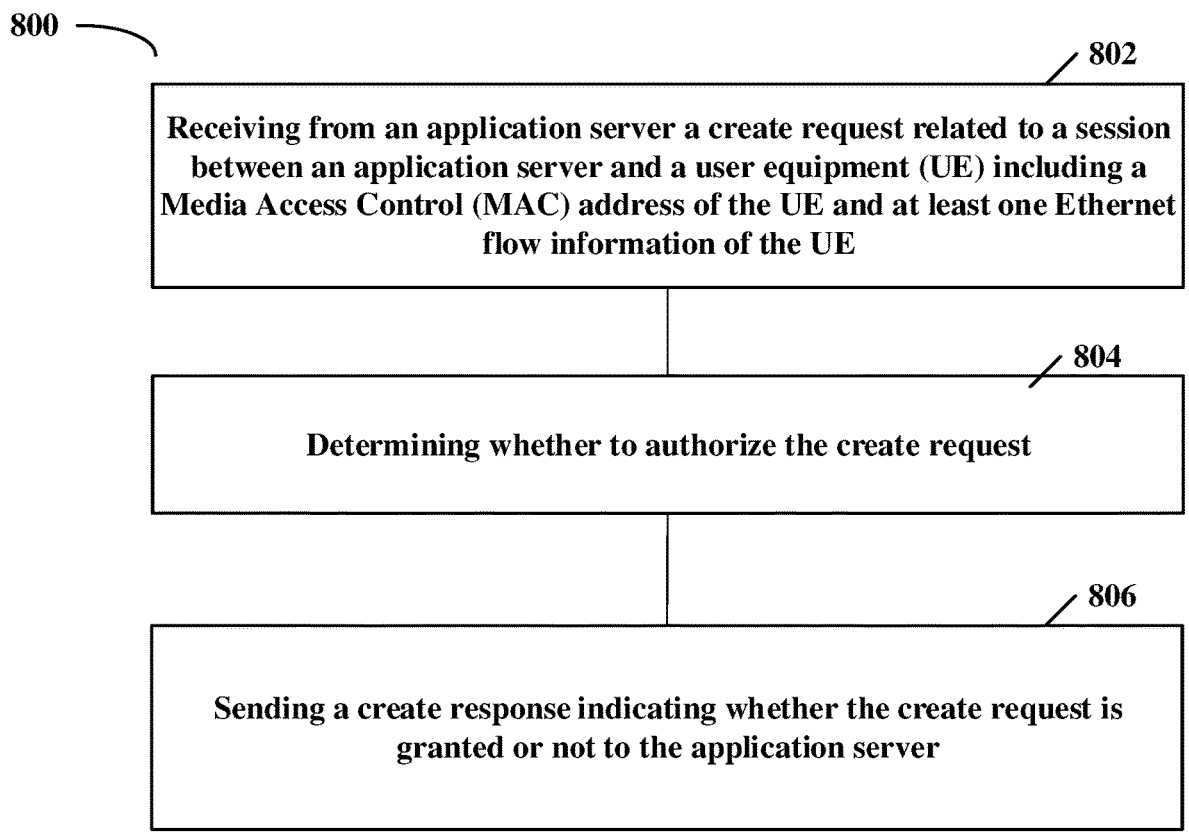
FIG. 8 shows a flowchart of a method according to another embodiment of the present disclosure.

FIG. 8 shows a flowchart of a method 800 according to an embodiment of the present disclosure, which may be performed by an apparatus implemented in at a network device such as the NEF as shown in FIGS. 1-4 or communicatively coupled to the network device. As such, the network device may provide means for accomplishing various parts of the method 800 as well as means for accomplishing other processes in conjunction with other components. For some parts which have been described in the above embodiments, detailed description thereof is omitted here for brevity.

At block 802, the network device may receive from an application server a create request related to a session between an application server and a user equipment (UE) including a Media Access Control (MAC) address of the UE and at least one Ethernet flow information of the UE. For example, the application server may send to the network device a create request related to a session between the application server and a user equipment (UE) including a Media Access Control (MAC) address of the UE and at least one Ethernet flow information of the UE at block 502 of FIG. 5, then the network device may receive from the application server the create request.

At block 804, the network device may determine whether to authorize the create request. The network device may determine whether to authorize the create request based on the information included in the create request such as at least one of AF Identifier, UE MAC address, Description of the application flows, Sponsor Information, Sponsoring Status, Reference ID. The network device may determine whether to authorize the create request by itself or through another network device or through the network device and another network device. For example, the network device may send an authorization request to another network device to determine whether to authorize the create request.

At block 806, the network device may send a create response indicating whether the create request is granted or not to the application server.

In an embodiment, the create request may indicate setting a chargeable party at the session set-up or setting up the session with required quality of service (QoS).

FIG. 9 shows a flowchart of a method 900 according to an embodiment of the present disclosure, which may be performed by an apparatus implemented in at a network device such as the NEF as shown in FIGS. 1-4 or communicatively coupled to the network device. As such, the network device may provide means for accomplishing various parts of the method 900 as well as means for accomplishing other processes in conjunction with other components. For some parts which have been described in the above embodiments, detailed description thereof is omitted here for brevity. In this embodiment, the create request indicates setting a chargeable party at the session set-up.

At block 902, the network device may receive from an application server a create request related to a session between an application server and a user equipment (UE) including a Media Access Control (MAC) address of the UE and at least one Ethernet flow information of the UE, wherein the create request indicates setting a chargeable party at the session set-up. For example, the application server may send to the network device a create request indicates setting a chargeable party at the session set-up at block 602 of FIG. 6, then the network device may receive from the application server the create request.

At block 904, the network device may determine whether to authorize the create request indicating setting a chargeable party at the session set-up. The network device may determine whether to authorize the create request based on the information included in the create request such as at least one of application server Identifier, UE MAC address, Description of the application flows, Sponsor Information, Sponsoring Status, Reference ID, etc. For example, the network device may send an authorization request to another network device to determine whether to authorize the create request.

In an embodiment, the authorization of the create request may be performed by the network device or another network device by sending a corresponding authorization request to the another network device. For example, in the NR, the network device such as NEF may authorize the create request indicating setting a chargeable party at the session set-up as described in steps 2-4 of FIG. 4.15.6.4-1 of 3GPP T523.502. In an embodiment, the corresponding authorization request may comprise a Npcf_PolicyAuthorization_Create request, wherein an Internet protocol (IP) address of the UE in the Npcf_PolicyAuthorization_Create request is replaced with the Media Access Control (MAC) address of the UE.

At block 906, the network device may send a create response indicating whether the create request is granted or not to the application server.

At block 908, the network device may receive from the application server a chargeable party update request including the at least one Ethernet flow information of the UE. For example, the application server may send to the network device the chargeable party update request including the at least one Ethernet flow information of the UE at block 606 of FIG. 6. then the network device may receive the chargeable party update request.

At block 910, the network device may determine whether to authorize the chargeable party update request. The authorization of the chargeable party update request may be performed by the network device or another network device by sending a corresponding authorization request to the another network device. For example, the network device may determine whether to authorize the chargeable party update request based on for example the information included in the chargeable party update request such as at least one of application server Identifier, the at least one Ethernet flow information of the UE, Sponsoring Status, Transaction Reference ID, Reference ID, etc. As another example, in the NR, the network device such as NEF may authorize the chargeable party update request as described in steps 2-4 of FIG. 4.15.6.5-1 of 3GPP TS23.502. In an embodiment, the corresponding authorization request may comprise a Npcf_PolicyAuthorization_Update request as described in clause 4.15.6.5 of 3GPP TS23.502.

At block 912, the network device may send a chargeable party update response indicating whether the chargeable party update request is granted or not to the application server.

In an embodiment, the chargeable party update request may comprise a Nnef_ChargeableParty_Update request as defined by clause 5.2.6.8.3 of 3GPP TS23.502 or its future version and the chargeable party update response comprises a Nnef_ChargeableParty_Update response as defined in clause 5.2.6.8.3 of 3GPP TS23.502 or its future version.

In an embodiment, the chargeable party update request may be included in a Hypertext Transfer Protocol (HTTP) PATCH message.

Figure 10:
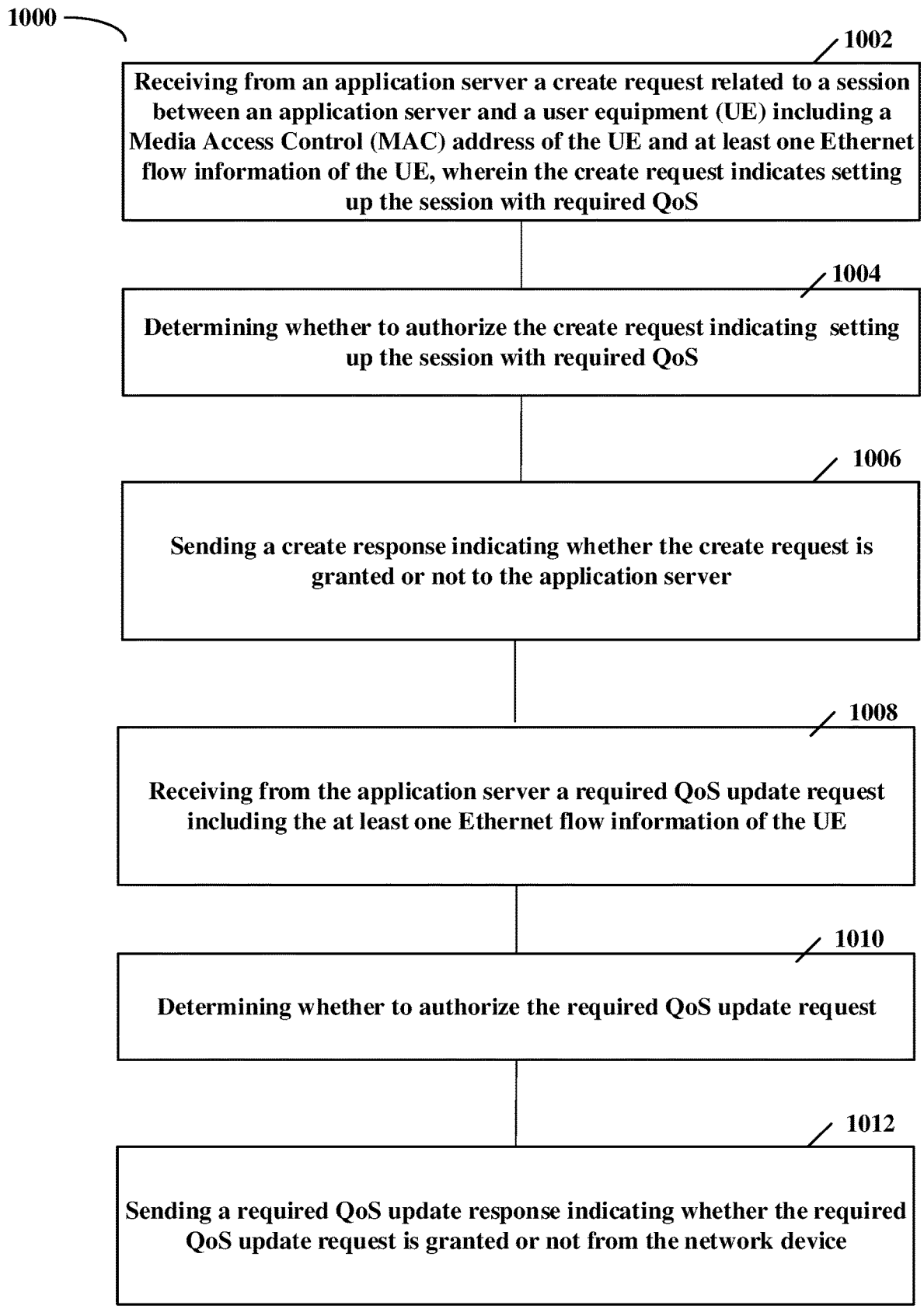
FIG. 10 shows a flowchart of a method according to another embodiment of the present disclosure.

FIG. 10 shows a flowchart of a method 1000 according to an embodiment of the present disclosure, which may be performed by an apparatus implemented in at a network device such as the NEF as shown in FIGS. 1-4 or communicatively coupled to the network device. As such, the network device may provide means for accomplishing various parts of the method 1000 as well as means for accomplishing other processes in conjunction with other components. For some parts which have been described in the above embodiments, detailed description thereof is omitted here for brevity. In this embodiment, the create request indicates setting up the session with required QoS.

At block 1002, the network device may receive from an application server a create request related to a session between an application server and a user equipment (UE) including a Media Access Control (MAC) address of the UE and at least one Ethernet flow information of the UE, wherein the create request indicates setting up the session with required QoS. For example, the application server may send to the network device a create request indicates setting up the session with required QoS at block 702, then the network device may receive from the application server the create request.

At block 1004, the network device may determine whether to authorize the create request indicating setting up the session with required QoS. The network device may determine whether to authorize the create request based on the information included in the create request, such as at least one of application server Identifier, UE MAC address, Description of the application flows, QoS reference, a period of time or a traffic volume for the requested QoS.

In an embodiment, the authorization of the create request indicating setting up the session with required QoS may be performed by the network device and another network device by sending an authorization request to the another network device when the authorization of the create request is granted by the network device. For example, in the NR, the network device such as NEF may authorize the create request indicates setting up the session with required QoS as described in steps 2-4 of FIG. 4.15.6.6-1 of 3GPP TS23.502. In an embodiment, the authorization request may comprise a Npcf_PolicyAuthorization_Create request as described in step 3 of FIG. 4.15.6.6-1 of 3GPP TS23.502, wherein an Internet protocol (IP) address of the UE in the Npcf_PolicyAuthorization_Create request is replaced with the Media Access Control (MAC) address of the UE.

At block 1006, the network device may send a create response indicating whether the create request is granted or not to the application server.

At block 1008, the network device may receive from the application server a required QoS update request including the at least one Ethernet flow information of the UE. For example, the application server may send to the network device the required QoS update request including the at least one Ethernet flow information of the UE at block 706 of FIG. 7. Then the network device may receive the required QoS update request.

In an embodiment, the required QoS update request may be included in a Hypertext Transfer Protocol (HTTP) PUT or PATCH message.

At block 1010, the network device may determine whether to authorize the required QoS update request. For example, the network device may determine whether to authorize the required QoS update request based on for example the information included in required QoS update request.

At block 1012, the network device may send a chargeable party update response indicating whether the chargeable party update request is granted or not to the application server.

In an embodiment, the create request comprises a Nnef_ChargeableParty_Create request as described in clause 4.15.6.4 of 3GPP TS23.502 or its future version, or a Nnef_AFsessionWithQoS_Create request as described in clause 4.15.6.6 of 3GPP TS23.502 or its future version. The create response comprises a Nnef_ChargeableParty_Create response as described in clause 4.15.6.4 of 3GPP TS23.502 or its future version, or a Nnef_AFsessionWithQoS_Create response as described in clause 4.15.6.6 of 3GPP TS23.502 or its future version. In addition, UE Internet protocol (IP) address and Description of application flows in the Nnef_ChargeableParty_Create request or the Nnef_AFsessionWithQoS_Create request are replaced with the MAC address of the UE and at least one Ethernet flow information of the UE respectively.

In an embodiment, the create request is included in a Hypertext Transfer Protocol (HTTP) POST message.

In an embodiment, the application server comprises an application function (AF), the network device comprises a Network Exposure function (NEF), and the another network device comprises a Policy Control Function (PCF).

In an embodiment, the procedures for changing the chargeable party at session set up or during the session may be used by a Service Capability Server (SCS)/AS to either request to sponsor the traffic from the beginning or to request becoming the chargeable party at a later point in time via a T8 interface. When setting up the connection between the AS and UE via the SCEF, the SCS/AS shall send an HTTP POST request to the SCEF for the "Chargeable Party Transactions" resource requesting to become the chargeable party for the session to be set up. The body of the HTTP POST message shall include SCS/AS Identifier, UE IP address, Flow description, Sponsor ID, Application Service Provider (ASP) ID, Sponsoring Status and may include time period and/or traffic volume used for sponsoring. The SCS/AS may also request to activate a previously selected policy of background data transfer by including Reference ID in the body of the HTTP POST message. If the flow information known by the SCS/AS is related to an Ethernet PDU session, the UE MAC address shall be included instead of UE IP address, and in addition the Ethernet Flow description shall be included.

In an embodiment, procedures for setting up an AS session with required QoS may be used to set up an AS session with required QoS for the service as defined in 3GPP TS 23.682, the disclosure of which is incorporated by reference herein in its entirety. For initial AS session creation, the SCS/AS shall send an HTTP POST message to the SCEF for the "AS Session with Required QoS Subscriptions" resource. The body of HTTP POST message shall include SCS/AS Identifier, UE IP address, Flow description, QoS reference and notification destination address. And it may also include time period and/or traffic volume for sponsored data connectivity purpose. If the flow information known by the SCS/AS is related to an Ethernet PDU session, the UE MAC address shall be included instead of the UE IP address, and in addition the Ethernet Flow description shall be included.

In an embodiment, Table 5.5.2.1.1-1 of 3GPP TS29.122 may be revised as following.

| Data type | Reference | Comments |
|---|---|---|
| EthFlow-Description | 3GPP TS 29.514 [xx] | Defines a packet filter for an Ethernet flow. |
| MacAddr48 | 3GPP TS 29.571 [45] | MAC Address. |
| Supported-Features | 3GPP TS 29.571 [45] | Used to negotiate the applicability of the optional features defined in table 5.5.4-1. |

In an embodiment, Table 5.5.2.1.2-1 of 3GPP TS29.122 may be revised as following.

| Attribute name | Data type | Cardinality | Description | Applicability (NOTE 1) |
|---|---|---|---|---|
| self | Link | 0 . . . 1 | Link to this resource. This parameter shall be supplied by the SCEF in HTTP responses that include an object of ChargeableParty type. | |
| supportedFeatures | SupportedFeatures | 0 . . . 1 | Used to negotiate the supported optional features of the API as described in subclause 5.2.7. | |

| Attribute name | Data type | Cardinality | Description | Applicability (NOTE 1) |
|---|---|---|---|---|
| notificationDestination | Link | 1 | This attribute shall be provided in the POST request and in the response of successful resource creation. Contains the URL to receive the notification of bearer level event(s) from the SCEF. | |
| requestTestNotification | boolean | 0 . . . 1 | Set to true by the SCS/AS to request the SCEF to send a test notification as defined in subclause 5.2.5.3. Set to false or omitted otherwise. | Notification_test_event |
| websockNotifConfig | WebsockNotifConfig | 0 . . . 1 | Configuration parameters to set up notification delivery over Websocket protocol as defined in subclause 5.2.5.4. | Notification_websocket |
| ipv4Addr | Ipv4Addr | 0 . . . 1 | Identifies the Ipv4 address. (NOTE 2) | |
| ipv6Addr | Ipv6Addr | 0 . . . 1 | Identifies the Ipv6 address. (NOTE 2) | |
| macAddr | MacAddr48 | 0 . . . 1 | Identifies the MAC address. (NOTE 2) | |
| flowInfo | array(FlowInfo) | 0 . . . N | Describes the application flows. (NOTE 3) | |
| ethFlowInfo | array(EthFlowDescription) | 0 . . . N | Identifies Ethernet packet flows. (NOTE 3) | |
| sponsorInformation | SponsorInformation | 1 | Describes the sponsor information such as who is sponsoring the traffic. | |
| sponsoringEnabled | boolean | 1 | Indicates sponsoring status. | |
| referenceId | BdtReferenceId | 0 . . . 1 | The reference ID for a previously selected policy of background data transfer. | |
| usageThreshold | UsageThreshold | 0 . . . 1 | Time period and/or traffic volume. | |

NOTE 1:
Properties marked with a feature as defined in subclause 5.5.4 are applicable as described in subclause 5.2.7. If no feature are indicated, the related property applies for all the features.
NOTE 2:
One of ipv4, ipv6 or MAC address shall be provided.
NOTE 3:
One of IP flow or Ethernet flow information shall be provided.

In an embodiment, Table 5.5.2.1.3-1 of 3GPP TS29.122 may be revised as following.

| Attribute name | Data type | Cardinality | Description | Applicability (NOTE) |
|---|---|---|---|---|
| flowInfo | array(FlowInfo) | 0 . . . N | Describes the application flows. | |
| ethFlowInfo | array(EthFlowDescription) | 0 . . . N | Describes Ethernet packet flows. | |
| sponsoringEnabled | boolean | 0 . . . 1 | Indicates sponsoring status. | |
| referenceId | BdtReferenceId | 0 . . . 1 | The reference ID for a previously selected policy of background data transfer. | |
| usageThreshold | UsageThresholdRm | 0 . . . 1 | Time period and/or traffic volume. | |

NOTE:
Properties marked with a feature as defined in subclause 5.5.4 are applicable as described in subclause 5.2.7. If no features are indicated, the related property applies for all the features.

In an embodiment, Table 5.14.2.1.2-1 of 3GPP TS29.122 may be revised as following.

| Attribute name | Data type | Cardinality | Description | Applicability (NOTE 1) |
|---|---|---|---|---|
| supportedFeatures | SupportedFeatures | 0 . . . 1 | Used to negotiate the supported optional features of the API as described in subclause 5.2.7. This attribute shall be provided in the POST request and in the response of successful resource creation. | |
| notificationDestination | Link | 1 | Contains the URL to receive the notification bearer level event(s) from the SCEF. | |
| flowInfo | array(FlowInfo) | 0 . . . N | Describe the data flow which requires QoS. (NOTE 3) | |
| ethFlowInfo | array(EthFlowDescription) | 0 . . . N | Identifies Ethernet packet flows. (NOTE 3) | |
| qosReference | string | 0 . . . 1 | Identifies a pre-defined QoS information | |
| ueIpv4Addr | Ipv4Addr | 0 . . . 1 | The Ipv4 address of the UE. (NOTE 2) | |
| ueIpv6Addr | Ipv6Addr | 0 . . . 1 | The Ipv6 address of the UE. (NOTE 2) | |
| macAddr | MacAddr48 | 0 . . . 1 | Identifies the MAC address. (NOTE 2) | |
| usageThreshold | UsageThreshold | 0 . . . 1 | Time period and/or traffic volume in which the QoS is to be applied. | |
| sponsorInfo | SponsorInformation | 0 . . . 1 | Indicates a sponsor information | |
| requestTestNotification | boolean | 0 . . . 1 | Set to true by the SCS/AS to request the SCEF to send a test notification as defined in subclause 5.2.5.3. Set to false or omitted otherwise. | Notification_test_event |
| websockNotifConfig | WebsockNotifConfig | 0 . . . 1 | Configuration parameters to set up notification delivery over Websocket protocol as defined in subclause 5.2.5.4. | Notification_websocket |

NOTE 1:
Properties marked with a feature as defined in subclause 5.14.4 are applicable as described in subclause 5.2.7. If no features are indicated, the related property applies for all the features.
NOTE 2:
One of the property "ueIpv4Addr", "ueIpv6Addr" or "macAddr" shall be included.
NOTE 3:
One of IP flow or Ethernet flow information shall be provided.

In an embodiment, Table 5.14.2.1.3-1 of 3GPP TS29.122 may be revised as following.

| Attribute name | Data type | Cardinality | Description | Applicability (NOTE) |
|---|---|---|---|---|
| flowInfo | array(FlowInfo) | 0 . . . N | Describe the data flow which requires QoS. | |
| ethFlowInfo | array(EthFlowDescription) | 0 . . . N | Describes Ethernet packet flows. | |
| qosReference | string | 0 . . . 1 | Pre-defined QoS reference | |
| usageThreshold | UsageThresholdRm | 0 . . . 1 | Time period and/or traffic volume in which the QoS is to be applied. | |

NOTE:
Properties marked with a feature as defined in subclause 5.14.4 are applicable as described in subclause 5.2.7. If no feature are indicated, the related property applies for all the features.

In an embodiment, Table 5.3.1-1 of TS 29.522 may be revised as following. The disclosure of 3GPP TS29.522 is incorporated by reference herein in its entirety

| API Name | Differences |
|---|---|
| ResourceManagement-OfBdt | |
| PfdManagement | |
| MonitoringEvent | |
| DeviceTriggering | |
| CpProvisioning | The "ExpectedUMT_5G" feature as described in subclause 5.11.4 of 3GPP TS 29.122 [4] shall be supported in 5G. |
| ChargeableParty | The MAC address of Ethernet UE and its associated Ethernet traffic filters shall be supported in 5G. |
| AsSessionWithQoS | The MAC address of Ethernet UE and its associated Ethernet traffic filters shall be supported in 5G. |

Many advantages may be achieved by applying the proposed solution according to some embodiments of the present disclosure. For example, some embodiments of the present disclosure can allow Ethernet UE to utilize the existing Chargeable Party and Setting up an AF session with required QoS functions in the NR.

The various blocks shown in FIG. 5-10 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 11A:
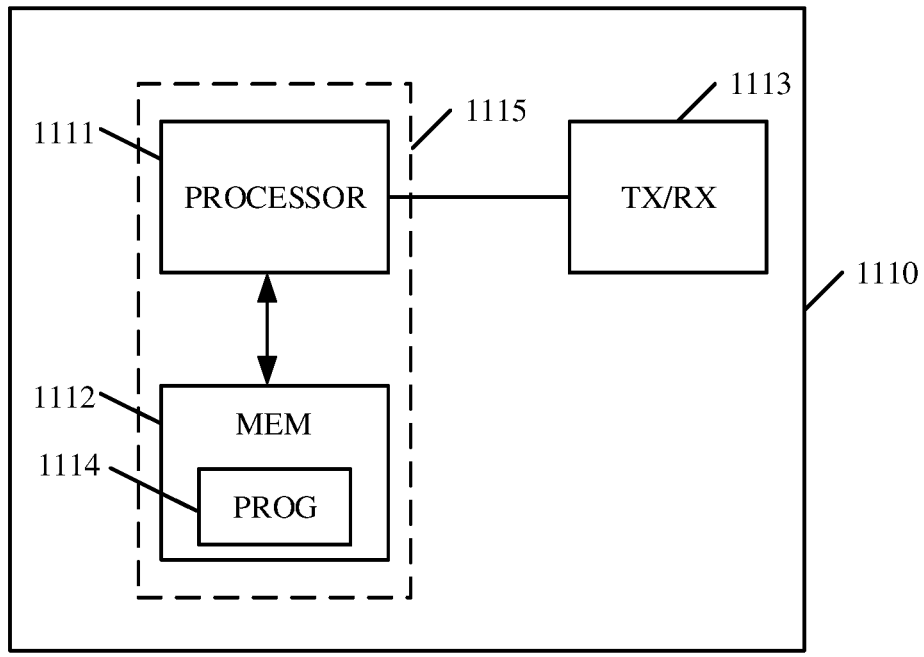
FIG. 11*a* illustrates simplified block diagrams of an apparatus according to an embodiment of the present disclosure.
Figure 11B:
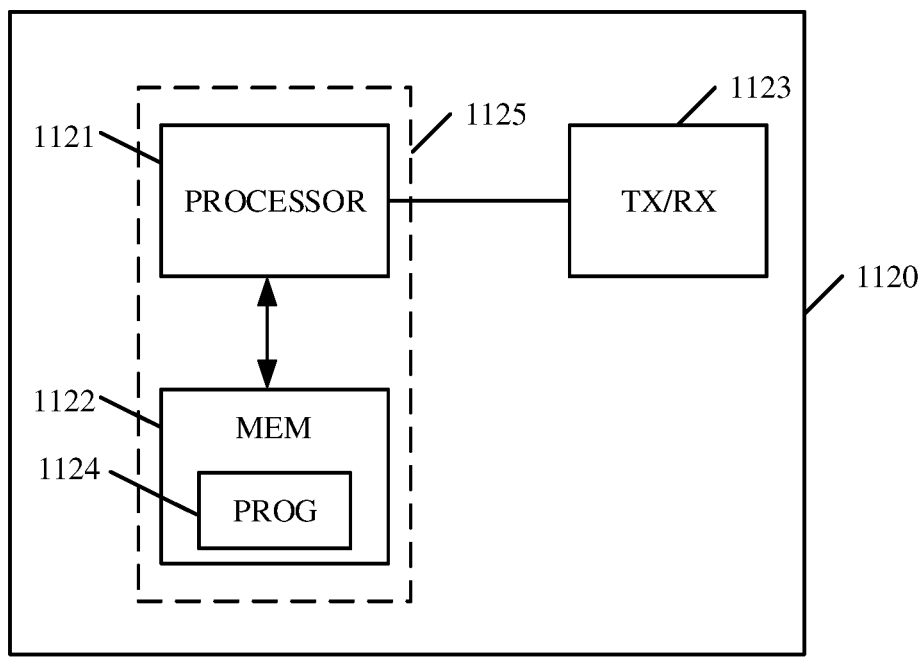
FIG. 11*b* illustrates simplified block diagrams of an apparatus according to another embodiment of the present disclosure.

FIG. 11*a* illustrates a simplified block diagram of an apparatus 1110 that may be embodied in/as an application server according to an embodiment of the present disclosure. FIG. 11*b* illustrates an apparatus 1120 that may be embodied in/as a network device according to an embodiment of the present disclosure.

The apparatus 1110 may comprise at least one processor 1111, such as a data processor (DP) and at least one memory (MEM) 1112 coupled to the processor 1111. The apparatus 1110 may further comprise a transmitter TX and receiver RX 1113 coupled to the processor 1111. The MEM 1112 stores a program (PROG) 1114. The PROG 1114 may include instructions that, when executed on the associated processor 1111, enable the apparatus 1110 to operate in accordance with the embodiments of the present disclosure, for example to perform any of the methods 300 and 400. A combination of the at least one processor 1111 and the at least one MEM 1112 may form processing means 1115 adapted to implement various embodiments of the present disclosure.

The apparatus 1120 comprises at least one processor 1121, such as a DP, and at least one MEM 1122 coupled to the processor 1121. The apparatus 1120 may further comprise a transmitter TX and receiver RX 1123 coupled to the processor 1121. The MEM 1122 stores a PROG 1124. The PROG 1124 may include instructions that, when executed on the associated processor 1121, enable the apparatus 1120 to operate in accordance with the embodiments of the present disclosure, for example to perform the method 500.

A combination of the at least one processor 1121 and the at least one MEM 1122 may form processing means 1125 adapted to implement various embodiments of the present disclosure.

Various embodiments of the present disclosure may be implemented by computer program executable by one or more of the processors 1111 and 1121, software, firmware, hardware or in a combination thereof.

The MEMs 1112 and 1122 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processors 1111 and 1121 may be of any type suitable to the local technical environment, and may include one or more of general purpose computers, special purpose computers, microprocessors, digital signal processors DSPs and processors based on multicore processor architecture, as non-limiting examples.

Figure 12:
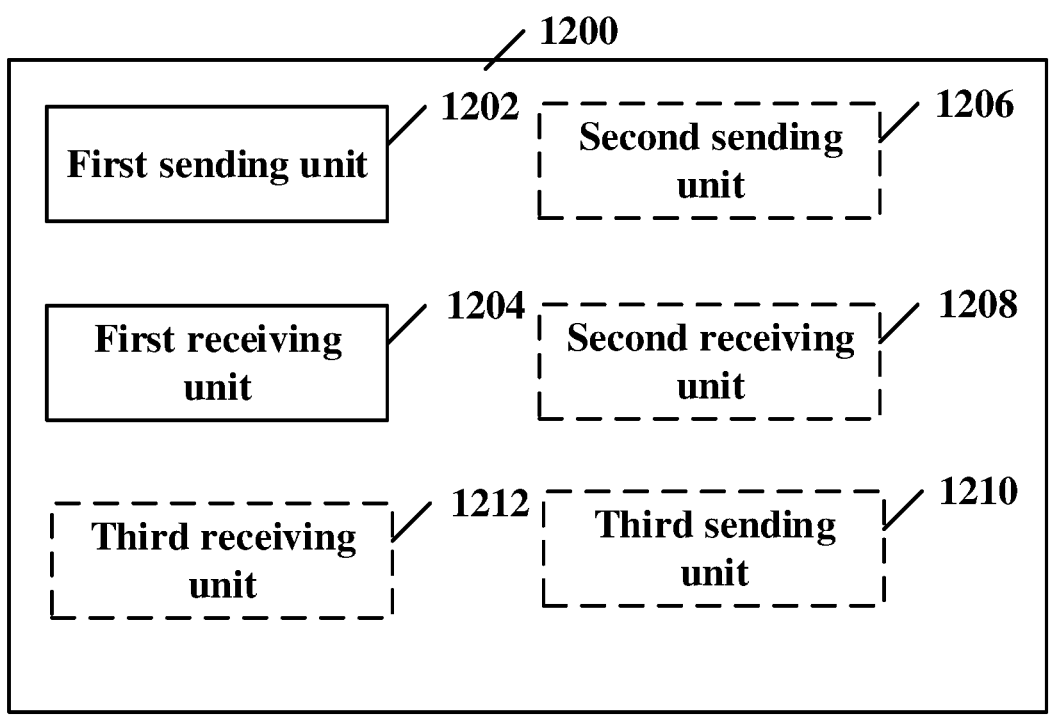
FIG. 12 illustrates simplified block diagrams of an apparatus according to another embodiment of the present disclosure.

Reference is now made to FIG. 12, which illustrates a schematic block diagram of an apparatus 1200 implemented at an application server. The apparatus 1200 is operable to carry out any of the exemplary methods 500, 600 and 700 and possibly any other processes or methods.

As shown in FIG. 12, the apparatus 1200 may comprise: a first sending unit 1202 configured to send to a network device a create request related to a session between the application server and a user equipment (UE) including a Media Access Control (MAC) address of the UE and at least one Ethernet flow information of the UE; and a first receiving unit 1204 configured to receive a create response indicating whether the create request is granted or not from the network device.

In an embodiment, the create request indicates setting a chargeable party at the session set-up or setting up the session with required quality of service (QoS).

In an embodiment, when the create request indicates setting a chargeable party at the session set-up, the apparatus 1200 may further comprise a second sending unit 1206 configured to send to the network device a chargeable party update request including the at least one Ethernet flow information of the UE; and a second receiving unit 1208 configured to receive a chargeable party update response indicating whether the chargeable party update request is granted or not from the network device.

In an embodiment, the chargeable party update request comprises a Nnef_ChargeableParty_Update request and the chargeable party update response comprises a Nnef_ChargeableParty_Update response.

In an embodiment, the chargeable party update request is included in a Hypertext Transfer Protocol (HTTP) PATCH message.

In an embodiment, when the create request indicates setting up the session with required QoS, the apparatus 1200 may further comprise a third sending unit 1210 configured to send to the network device a required QoS update request including the at least one Ethernet flow information of the UE; and a third receiving unit 1212 configured to receive a required QoS update response indicating whether the required QoS update request is granted or not from the network device.

In an embodiment, the required QoS update request is included in a Hypertext Transfer Protocol (HTTP) PUT or PATCH message.

In an embodiment, the create request comprises a Nnef_ChargeableParty_Create request or a Nnef_AFsessionWithQoS_Create request and the create response comprises a Nnef_ChargeableParty_Create response or a Nnef_AFsessionWithQoS_Create response, wherein UE Internet protocol (IP) address and Description of application flows in the Nnef_ChargeableParty_Create request or the Nnef_AFsessionWithQoS_Create request are replaced with the MAC address of the UE and at least one Ethernet flow information of the UE respectively.

In an embodiment, the create request is included in a Hypertext Transfer Protocol (HTTP) POST message.

In an embodiment, the application server comprises an application function (AF) and the network device comprises a Network Exposure function (NEF).

Figure 13:
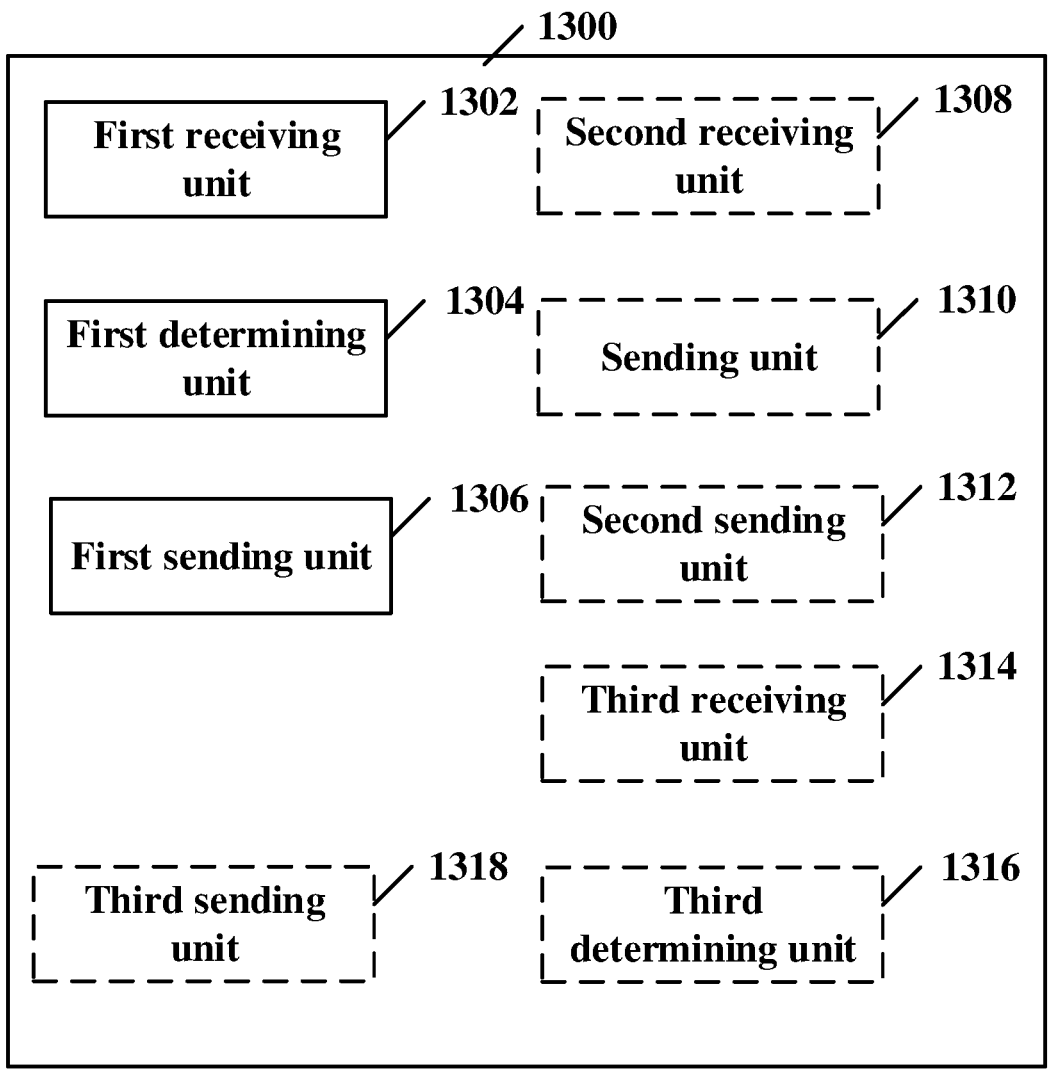
FIG. 13 illustrates simplified block diagrams of an apparatus according to another embodiment of the present disclosure.

Reference is now made to FIG. 13, which illustrates a schematic block diagram of an apparatus 1300 implemented at a network device. The apparatus 1300 is operable to carry out any of the exemplary methods 800, 900 and 1000 and possibly any other processes or methods.

As shown in FIG. 13, the apparatus 1300 may comprise: a first receiving unit 1302 configured to receive from an application server a create request related to a session between an application server and a user equipment (UE) including a Media Access Control (MAC) address of the UE and at least one Ethernet flow information of the UE; a sending unit 1304 configured to send an authorization request to another network device to determine whether to authorize the create request; and a first sending unit 1306 configured to send a create response indicating whether the create request is granted or not to the application server.

In an embodiment, the create request indicates setting a chargeable party at the session set-up or setting up the session with required quality of service (QoS).

In an embodiment, when the create request indicates setting a chargeable party at the session set-up, the apparatus 1300 may comprise a second receiving unit 1308 configured to receive from the application server a chargeable party update request including the at least one Ethernet flow information of the UE; a second determining unit 1310 configured to determine whether to authorize the chargeable party update request; and a second sending unit 1312 configured to send a chargeable party update response indicating whether the chargeable party update request is granted or not to the application server.

In an embodiment, the authorization of the create request and/or the authorization of the chargeable party update request is performed by the network device or another network device by sending a corresponding authorization request to the another network device.

In an embodiment, the corresponding authorization request comprises a Npcf_PolicyAuthorization_Create request or a Npcf_PolicyAuthorization_Update request, wherein an Internet protocol (IP) address of the UE in the Npcf_PolicyAuthorization_Create request is replaced with the Media Access Control (MAC) address of the UE.

In an embodiment, the chargeable party update request comprises a Nnef_ChargeableParty_Update request and the chargeable party update response comprises a Nnef_ChargeableParty_Update response.

In an embodiment, the chargeable party update request is included in a Hypertext Transfer Protocol (HTTP) PATCH message.

In an embodiment, when the create request indicates setting up the session with required QoS, the apparatus 1300 may comprise a third receiving unit 1314 configured to receive from the application server a required QoS update request including the at least one Ethernet flow information of the UE; a third determining unit 1316 configured to determine whether to authorize the required QoS update request; and a third sending unit 1318 configured to send a required QoS update response indicating whether the required QoS update request is granted or not from the network device.

In an embodiment, the required QoS update request is included in a Hypertext Transfer Protocol (HTTP) PUT or PATCH message.

In an embodiment, when the create request indicates setting up the session with required QoS, the authorization of the create request is performed by the network device and another network device by sending an authorization request to the another network device when the authorization of the create request is granted by the network device.

In an embodiment, the authorization request comprises a Npcf_PolicyAuthorization_Create request, wherein an Internet protocol (IP) address of the UE in the Npcf_PolicyAuthorization_Create request is replaced with the Media Access Control (MAC) address of the UE.

In an embodiment, the create request comprises a Nnef_ChargeableParty_Create request or a Nnef_AFsessionWithQoS_Create request and the create response comprises a Nnef_ChargeableParty_Create response or a Nnef_AFsessionWithQoS_Create response, wherein UE Internet protocol (IP) address and Description of application flows in the Nnef_ChargeableParty_Create request or the Nnef_AFsessionWithQoS_Create request are replaced with the MAC address of the UE and at least one Ethernet flow information of the UE respectively.

In an embodiment, the create request is included in a Hypertext Transfer Protocol (HTTP) POST message.

In an embodiment, the application server comprises an application function (AF), the network device comprises a Network Exposure function (NEF), and the another network device comprises a Policy Control Function (PCF).

It would be appreciated that, some units or modules in the apparatus 1200 and 1300 can be combined in some implementations. For example, in one embodiment, it is possible to use a single transceiving unit to send and receive information.

According to an aspect of the disclosure it is provided a computer program product being tangibly stored on a computer readable storage medium and including instructions which, when executed on at least one processor, cause the at least one processor to carry out any of the methods related to the application server as described above.

According to an aspect of the disclosure it is provided a computer program product being tangibly stored on a computer readable storage medium and including instructions which, when executed on at least one processor, cause the at least one processor to carry out any of the methods related to network device as described above.

According to an aspect of the disclosure it is provided a computer-readable storage medium storing instructions which when executed by at least one processor, cause the at least one processor to carry out any of the methods related to the application server as described above.

According to an aspect of the disclosure it is provided a computer-readable storage medium storing instructions which when executed by at least one processor, cause the at least one processor to carry out any of the methods related to the network device as described above.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method implemented at an application server, comprising:
    sending to a network device a create request related to a session between the application server and a user equipment (UE), including a Media Access Control (MAC) address of the UE and at least one Ethernet flow information of the UE, wherein the create request indicates setting up the session with a required quality of service (QoS); and
    receiving a create response indicating whether the create request is granted or not granted from the network device,
    wherein the create request comprises a QoS Reference to identify QoS information,
    wherein the create request further comprises a Nnef_AFsession WithQoS_Create request, and the create response comprises a Nnef_AFsession WithQoS_Create response, the Nnef_AFsession WithQoS Create request comprises the MAC address of the UE and the at least one Ethernet flow information of the UE.

2. The method according to claim 1, wherein when the create request indicates setting up the session with the required QoS, the method further comprises:
    sending to the network device a required QoS update request including the at least one Ethernet flow information of the UE; and
    receiving a required QoS update response indicating whether the required QoS update request is granted or not granted from the network device.

3. The method according to claim 2, wherein the required QoS update request is included in a Hypertext Transfer Protocol (HTTP) PUT or PATCH message.

4. The method according to claim 1, wherein the create request is included in a Hypertext Transfer Protocol (HTTP) POST message.

5. The method according to claim 1, wherein the application server comprises an application function (AF) and the network device comprises a Network Exposure function (NEF).

6. A method implemented at a network device, comprising:
    receiving from an application server a create request related to a session between an application server and a user equipment (UE), including a Media Access Control (MAC) address of the UE and at least one Ethernet flow information of the UE, wherein the create request indicates setting up the session with a required quality of service (QoS);

sending an authorization request to another network device to determine whether to authorize the create request; and sending a create response indicating whether the create request is granted or not granted to the application server, wherein the create request comprises a QoS Reference to identify QoS information, wherein the create request further comprises a Nnef_AFsession WithQoS_Create request, and the create response comprises a Nnef_AFsession WithQoS_Create response, the Nnef_AFsession WithQoS_Create request comprises the MAC address of the UE and the at least one Ethernet flow information of the UE.

7. The method according to claim 6, wherein when the create request indicates setting up the session with the required QoS, the method further comprises:

receiving from the application server a required QoS update request including the at least one Ethernet flow information of the UE;

determining whether to authorize the required QoS update request; and sending a required QoS update response indicating whether the required QoS update request is granted or not granted from the network device.

8. The method according to claim 7, wherein the required QoS update request is included in a Hypertext Transfer Protocol (HTTP) PUT or PATCH message.

9. The method according to claim 6, wherein when the create request indicates setting up the session with required QoS, the authorization of the create request is performed by the network device and another network device, by sending an authorization request to the another network device when the authorization of the create request is granted by the network device.

10. The method according to claim 9, wherein the authorization request comprises a Npcf_PolicyAuthorization_Create request and wherein an Internet protocol (IP) address of the UE in the Npcf_Policy Authorization_Create request is replaced with the Media Access Control (MAC) address of the UE.

11. The method according to claim 6, wherein the create request is included in a Hypertext Transfer Protocol (HTTP) POST message.

12. The method according to claim 6, wherein the application server comprises an application function (AF), the network device comprises a Network Exposure function (NEF), and the another network device comprises a Policy Control Function (PCF).

13. An apparatus implemented at an application server, comprising:

a processor; and a memory coupled to the processor, said memory containing instructions which, when executed by said processor, cause said apparatus to:

send to a network device a create request related to a session between the application server and a user equipment (UE), including a Media Access Control (MAC) address of the UE and at least one Ethernet flow information of the UE, wherein the create request indicates setting up the session with a required quality of service (QoS); and receive a create response indicating whether the create request is granted or not granted from the network device, wherein the create request comprises a QoS Reference to identify QoS information, wherein the create request further comprises a Nnef_AFsession WithQoS_Create request, and the create response comprises a Nnef_AFsession WithQoS_Create response, the Nnef_AFsession WithQoS_Create request comprises the MAC address of the UE and the at least one Ethernet flow information of the UE.

14. An apparatus implemented at a network device, comprising:

a processor; and a memory coupled to the processor, said memory containing instructions which, when executed by said processor, cause said apparatus to:

receive from an application server a create request related to a session between an application server and a user equipment (UE), including a Media Access Control (MAC) address of the UE and at least one Ethernet flow information of the UE, wherein the create request indicates setting up the session with a required quality of service (QoS);

send an authorization request to another network device to determine whether to authorize the create request; and send a create response indicating whether the create request is granted or not granted to the application server, wherein the create request comprises a QoS Reference to identify QoS information, wherein the create request further comprises a Nnef_AFsession WithQoS_Create request, and the create response comprises a Nnef_AFsession WithQoS_Create response, the Nnef_AFsession WithQoS_Create request comprises the MAC address of the UE and the at least one Ethernet flow information of the UE.

* * * * *